United States Patent Office 2,923,742
Patented Feb. 2, 1960

2,923,742

FLUOROCARBON PHOSPHORUS RINGS

Anton B. Burg and Walter Mahler, Los Angeles, Calif., assignors, by mesne assignments, to American Potash & Chemical Corporation, a corporation of Delaware No Drawing. Application December 30, 1957
Serial No. 705,831

8 Claims. (Cl. 260—606.5)

This invention reates in general to the manufacture of phosphorus-containing compounds and more particularly to the preparation of ring compounds wherein each phosphorus atom present is joined to two adjacent phosphorus atoms.

It is an object of this invention to provide a process for the production of antioxidants.

A further object of this invention is to provide a group of basically inorganic antioxidants which are soluble in hydrocarbons and which are distinguished by the fact that adjacent phosphorus atoms are joined one to the next.

Ancillary objects and advantages of this invention, if not specifically set out, will become apparent during the course of the detailed description which follows.

Broadly, it has been found that certain chemical compositions having general formula $(PCF_3)_x$ wherein $x$ designates an integer greater than 3, the most common representatives of which are the compounds $(PCF_3)_4$ and $(PCF_3)_5$, having phosphorus atoms bonded one to another (the P—P binding being enhanced by the presence of $CF_3$ groups, one on each P), may be prepared. These compounds may be readily formed by the reaction of $CF_3PI_2$ and mercury preferably at room temperature. Mixtures of the desired polymers, predominantly the tetramer and pentamer with traces of higher polymers are obtained.

More particularly, it has been found that ring compounds having the general formula of $(PCF_3)_x$ may be obtained in approximately a 40 to 60 ratio of $(PCF_3)_5$ (normally a slightly volatile liquid of molecular weight close to 500) to $(PCF_3)_4$ (normally a slightly more volatile crystalline substance of molecular weight in the vicinity of 400), lesser quantities of the higher polymers being present in the reaction mixture, where $CF_3PI_2$ is reacted with mercury, most conveniently at room temperature. Higher temperatures may be used to increase the reaction, e.g., 50–60° C. A temperature range of 0–100° C. may be used.

It is believed that the observed improved stability of these compounds to heat, etc., is due to the extra bonding involving the lone electron-pair on each phosphorus atom with the 3-$d$ orbitals of adjacent phosphorus atoms. However, this is largely speculative and it is not desired to limit the invention to any particular theory either with regard to the reasons for increased stability or to details of the chemical reactions involved. In all events, it is certain that each phosphorus atom is joined in ring fashion to adjacent phosphorus atoms with a $CF_3$ group being carried on each P atom.

For example, in the case of the tetramer $(PCF_3)_4$, it is probable that the molecule comprises a square of phosphorus atoms with a $CF_3$ group on each. It is not sterically possible for $CF_3$ groups to be attached to right angles to the plane of the square but it cannot easily be determined whether they are coplanar with the square or hang off at an angle. Also, it is difficult to say whether the coplanar case would place $CF_3$ groups in line with the sides of the square or in a line bisecting the square along the diagonal.

The reactant $CF_3PI_2$ is conveniently prepared according to the method set forth in the paper entitled "The Synthesis of Fluorocarbon Phosphorus Iodides" published in the Journal of the American Chemical Society, 79, 247 (1957) by Anton B. Burg et al. Comparison of the vapor tensions of the solid and liquid tetramer with the vapor tensions of the solid and liquid pentamer shows that the optimum temperature for separation of these two major components by distillation is above 65° C. A temperature of 100° C. is preferred.

Preferably the $CF_3PI_2$ which is reacted with mercury is as highly purified as possible; otherwise it has been found that a large number of by-products are formed, such by-products either being the impurities themselves or due to the various side reactions catalyzed by the presence of the impurities.

The pentamer of $CF_3P$ is a liquid at room temperature and under certain circumstances may be supercooled to a mobile form even down to the boiling point of nitrogen. However, its true melting point seems to be near −32° C. Its ability to remain liquid at low temperatures is a convenient basis for its separation from the solid $(CF_3P)_4$ by the use of a drain off separator. The last of the more volatile tetramer may be removed by refluxing the liquid.

The example below is to be regarded as merely illustrative of the invention and is not to be interpreted as placing limitations upon the scope thereof other than as set forth in the appended claims.

*Example.*—When 61 g. (.17 mole) $CF_3PI_2$ were shaken with 250 g. of mercury at room temperatures, iodides of mercury were produced together with 6.445 g. (.013 mole) of $(PCF_3)_5$ and 10.676 g. (.026 mole) of $(PCF_3)_4$. The solid tetramer, $(PCF_3)_4$ was separated from the liquid pentamer, $(PCF_3)_5$ by draining the liquid into the lower bulb of a two-chamber device separated by a magnetically operated needle valve. Higher purity of the separated fractions was obtained by fractional distillation. Total yield in terms of $PCF_3$ is 99%.

As can be seen from the foregoing example, this invention provides a means of producing a mixture of the tetramer and pentamer in approximately a 60% to 40% ratio. Traces of the higher polymers of the $PCF_3$ unit are also present.

A definitive experiment was conducted wherein the nature of the 400 molecular weight material was determined: 0.25 mole of this material was reacted with iodine in excess to form 1.0 mole of $CF_3PI_2$. This product was identified by its vapor tension of 2 mm. at 22° C. (in agreement with an authentic sample). Its hydrolysis gave 0.88 mole of $HCF_3$. The deviation from 1.00 $HCF_3$ probably can be attributed to the reactivity of the iodine with stop-cock grease and possibly stray mercury; however, the value 0.88 means that the molecule of the 400 material has no less than 4 $CF_3$ groups as well as 4 P atoms, adding up to a molecular weight of 400 for the $(PCF_3)_4$ molecule. Since four $CF_3P$ units came out as $CF_3PI_2$, it is clear that each P atom of the molecule carries a $CF_3$ group.

The other product of the $CF_3PI_2$–Hg reaction was purified in accordance with the distillation method set forth above and its molecular weight was measured as 494. Its reaction with excess iodine gave 4.85 $CF_3PI_2$, which in turn gave 4.65 $HCF_3$ by alkaline hydrolysis. These results show that the compound is composed of five $CF_3P$ groups, the disposition of which would have to be a $P_5$ ring. $F^{19}$ nuclear magnetic resonance spectra of $(PCF_3)_4$ and $(PCF_3)_5$ confirm the suggested structure.

As indicated earlier, the $(PCF_3)_x$ polymer finds use as an antioxidant soluble in hydrocarbons. Further the polymer may be oxidized to $(CF_3PO_2)_x$ polymers which are entirely resistant to the further action of oxygen. This substance is analogous to the known phosphoric acid anhydride and exhibits a drying power analogous to that of the phosphoric acid anhydride.

Specifically, the oxidation procedure is as follows: 1.43 mmole of $(CF_3P)_4$ was dissolved in 4 g. of fluorocarbon solvent having the molecular formula $CaF_{16}O$. The solution was agitated with a magnetic stirrer. Oxygen was passed into the solution at room temperature. There was a ten minute induction period followed by very rapid absorption of one O atom per $CF_3P$ unit. A second O atom was absorbed at a fairly fast but measurable rate, approximately first-order relative to the phosphorus compound, that is, the rate was roughly proportional to the concentration of the unoxidized solute, the pressure of oxygen being approximately constant. 5.72 mmoles of $O_2$ were absorbed for a ratio of $O_2$ to $(CF_3P)_4$ of 4.00 to 1. In a later experiment, the absorption of oxygen was slightly greater: 4.26 mmoles of $O_2$ per mmole of $(CF_3P)_4$. On heating to 330° C., some oxygen was recovered suggesting that it may have been present as a peroxy-phosphoric compound. The formation of the peroxide would be a reasonable first step in a chain reaction for which an induction period would be observed. The empirical formula $(CF_3PO_2)_x$ was derived from the reaction balance.

The reaction of $(CF_3PO_2)_x$ with water proved to be nearly as vigorous as that of $P_4O_{10}$.

These $(CF_3PO_2)_x$ polymers are completely resistant to the further action of oxygen and thus may be used where an oxidation resistant water scavenger is desired. The polymer, as prepared above, is far from a single substance, but the solid portions thereof may be isolated by heating to 125° C. in a high vacuum whereby to volatilize a clear liquid portion. A rigid foamy glass is obtained. At 250° C., this glassy foam shows some volatility but remains amorphous. At 336° C. for 36 hours extensive decomposition to form $COF_2$ as the main volatile product was observed.

As aforestated, the polymeric product may be used at high temperatures where an oxidation resistant water scavenger is desired and especially where high temperatures are encountered. Specifically, polymeric materials may be added to lubricants and hydraulic fluids where they are capable of scavenging the water which metals normally exude to a small but troublesome extent when elevated-temperature operating conditions are encountered.

The $CF_3P$ polymers which are the subject of this invention have further practical value as additives for lubricants and hydraulic fluids for the prevention of damage by ionizing radiation. The manner of addition may be either direct admixture of one of the $(CF_3P)_x$ compounds, especially to a fluorocarbon high-temperature fluid, or use of the same bonding principle by making $(R_FP)_x$ compounds in which the oily aspect resides in the $R_F$ chains. The radiation protection is based upon the existence of closely-spaced molecular-orbital energy levels belonging to the lone-pair electrons in the $P_x$ rings. The effect is that whenever the main material receives a quantum or particle of high-energy radiation, the resulting activated point can be deactivated by the $(CF_3P)_x$ compound before any bond-breaking occurs; and the $(CF_3P)_x$ compound itself has the ability to disperse the energy as heat, through use of the molecular-orbital delocalized-electron energy levels.

There is still a further use for the $CF_3P$ polymers—as incendiary igniters. The polymers are stable in acids, solvents and water, but are pyrophoric at ordinary room temperature. Thus the compounds may serve as selective igniter materials.

Obviously many modifications and variations of the invention as hereinbefore set forth may be made without departing from the spirit and scope thereof, and therefore only such limitations should be imposed as are indicated in the appended claims.

We claim:
1. A chemical compound having the formula $(PCF_3)_x$ wherein $x$ is an integer from 4 to 5.
2. A chemical composition having the formula $(PCF_3)_x$ wherein the phosphorus atoms are joined in a ring configuration and wherein a $CF_3$ substituent is carried by each of said phosphorus atoms, the $x$ designating the degree of polymerization and being an integer from 4 to 5.
3. A chemical compound consisting of a four membered phosphorus ring having $CF_3$ groups on each of said phosphorus atoms.
4. A chemical compound consisting of a five membered phosphorus ring having $CF_3$ groups on each of said phosphorus atoms.
5. A process for preparing a compound having the formula $(PCF_3)_x$ wherein $x$ is an integer from 4 to 5 consisting in reacting $CF_3PI_2$ with mercury.
6. The process of claim 5 wherein said $CF_3PI_2$ is highly purified whereby to suppress formation of by-products.
7. The process of claim 5 wherein the reaction occurs at about room temperature.
8. The process of claim 5 wherein the reaction occurs at about 50–60° C.

No references cited.